(12) United States Patent
Cho

(10) Patent No.: US 6,353,748 B1
(45) Date of Patent: Mar. 5, 2002

(54) DIGITAL WIRELESS LOCAL LOOP FAX/DATA INTERFACE

(75) Inventor: Yong Seok Cho, Kansas City, MO (US)

(73) Assignee: Semax Wireless, Inc., San Diego, CA (US)

( * ) Notice: Subject to any disclaimer, the term of this patent is extended or adjusted under 35 U.S.C. 154(b) by 0 days.

(21) Appl. No.: 09/315,371

(22) Filed: May 18, 1999

(51) Int. Cl.[7] .................................................. H04B 1/38
(52) U.S. Cl. ........................ 455/557; 455/426; 455/550
(58) Field of Search ................................. 455/557, 403, 455/552, 555, 556, 426, 550; 358/442, 407, 435, 400; 375/220

(56) References Cited

U.S. PATENT DOCUMENTS

| | | | |
|---|---|---|---|
| 4,910,610 A | * 3/1990 | Utsugi | 358/435 |
| 4,964,154 A | * 10/1990 | Shimotono | 379/100.15 |
| 5,200,991 A | 4/1993 | Motoyanagi | |
| 5,426,511 A | * 6/1995 | Nagatomo | 358/402 |
| 5,450,472 A | 9/1995 | Brax | |
| 5,450,530 A | * 9/1995 | Snyder et al. | 375/220 |
| 5,463,477 A | 10/1995 | Kakizaki | |
| 5,479,475 A | 12/1995 | Grob et al. | |
| 5,487,175 A | 1/1996 | Bayley et al. | |
| 5,509,050 A | 4/1996 | Berland | |
| 5,590,406 A | 12/1996 | Bayley et al. | |
| 5,594,952 A | 1/1997 | Virtuoso et al. | |
| 5,638,412 A | 6/1997 | Blakeney, II et al. | |
| 5,684,608 A | * 11/1997 | Charbonnier et al. | 358/442 |
| 5,692,035 A | 11/1997 | O'Mahony et al. | |
| 5,889,837 A | * 3/1999 | Sands | 379/27 |
| 5,953,647 A | * 9/1999 | Patel et al. | 455/343 |
| 5,953,675 A | * 9/1999 | Rabina et al. | 455/557 |
| 6,038,037 A | * 3/2000 | Leung et al. | 358/434 |
| 6,052,409 A | * 4/2000 | Quirk et al. | 375/220 |
| 6,157,846 A | * 12/2000 | Manning et al. | 455/557 |

* cited by examiner

*Primary Examiner*—Nay Maung
*Assistant Examiner*—Sonny Trinh
(74) *Attorney, Agent, or Firm*—Hovey, Williams, Timmons & Collins

(57) ABSTRACT

A preferred fax/data interface apparatus (10) enables the use of a conventional analog fax machine (20) on a wireless local loop (WLL) (12). The wireless local loop (12) includes a WLL terminal (14) having a telephone line (16) connected to the analog telephone port (18) thereof with an analog fax machine (20) connected to the telephone line (16), and with the fax/data interface (10) connected between the data port (26) of the WLL terminal (14) and the telephone line (16). The interface (10) receives analog fax signals from the fax machine (20) over the telephone line (16) and converts the analog fax signals to digital fax signals for delivery to the data port (26) of the WLL terminal (14) for wireless PCS transmission. In response to receipt of digital fax signals by PCS transmission, the WLL terminal (14) delivers the digital fax signals by way of the data port (26) to the interface (10) which converts the digital fax signals to analog fax signals for delivery to the fax machine (20) over the telephone line (16).

1 Claim, 1 Drawing Sheet

DIGITAL WIRELESS LOCAL LOOP FAX/DATA INTERFACE

BACKGROUND OF THE INVENTION

1. Field of the Invention

The present invention relates to the field of PCS communications using a wireless local loop (WLL). In particular, the invention is concerned with a preferred fax/data interface apparatus that enables the use of a conventional analog fax machine on a wireless local loop (WLL).

2. Description of the Prior Art

In areas where cellular telephone service is available, it is often desirable to configure such service in a building such as a house or office to emulate plain old telephone service (POTS). This is accomplished by configuring a wireless local loop (WLL) using a WLL terminal having an analog telephone port to which a conventional telephone line is connected with analog telephones connected to the telephone line.

The WLL terminal provides wireless communication with the cellular network and provides analog emulation on the telephone lines. That is, the WLL terminal provides dial tone when a connected analog telephone goes off hook, and processes DTMF tones and rotary dial signals from the telephone in order to initiate the corresponding call over the cellular network. For incoming calls, the WLL terminal receives the incoming wireless signals and rings the connected telephones. Also, the WLL terminal includes a data port to which the computer can be connected for handling digital fax signals.

These prior art wireless local loops, however, cannot handle conventional analog telefacsimile (fax) machines. This is because conventional WLL terminals provide the analog interface only in the voice band and analog fax machines operate outside the voice band. This prevents the use of a conventional and inexpensive analog fax machine. As a result, prior art wireless local loops do not provide a complete emulation of plain old telephone service.

SUMMARY OF THE INVENTION

The present invention solves the prior art problems discussed above and provides a distinct advance in the state of the art. In particular, the fax/data interface hereof enables the use of a conventional analog fax machine on a wireless local loop.

The preferred fax/data interface apparatus of the present invention includes a digital fax port, an analog fax port, and a signal processor connected between the fax ports for use in the preferred WLL and preferred method of the present invention. The signal processor is operable to receive digital fax signals from a WLL terminal at the digital fax port and to respond thereto by producing analog fax signals representative thereof at the analog fax port for delivery to an analog fax machine by way of a telephone line connected to the analog telephone port of the WLL terminal. Similarly, the signal processor is operable to receive analog fax signals at the analog fax port and to respond by producing digital fax signals representative thereof at the digital fax port for delivery to the data port of the WLL terminal.

In preferred forms, the signal processor is operable to detect CED "receive fax tones" and CNG "send fax tones" at the analog port and to respond by sending a data channel request message by way of the digital fax port to the data port of the WLL terminal. Other preferred aspects of the present invention are disclosed herein.

DETAILED DESCRIPTION OF THE PREFERRED EMBODIMENT

Figures 1, 2:
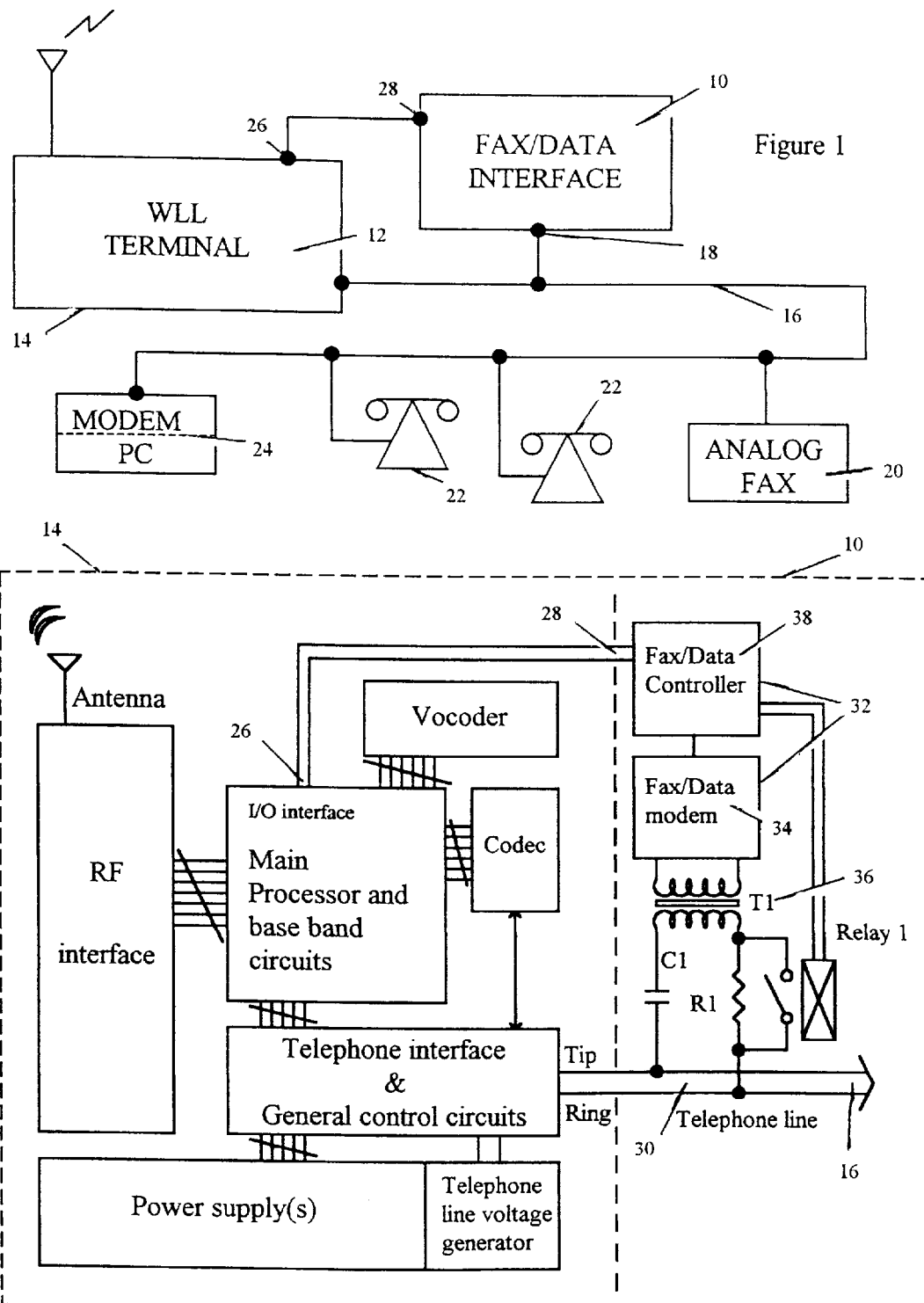
FIG. 1 is a block diagram illustrating the preferred fax/data interface apparatus shown in use as part of the preferred wireless local loop (WLL) of the present invention.
FIG. 2 is an electrical block diagram in partial schematic illustrating the fax/data interface apparatus and WLL terminal of FIG. 1.

FIG. 1 illustrates preferred fax/data interface apparatus 10 shown in use as part of preferred wireless local loop (WLL) 12 of the present invention. WLL 12 further includes WLL terminal 14, telephone line 16 connected to analog telephone port 18 of terminal 14, and a plurality of devices connected to line 16 including conventional, analog telefacsimile (fax) machine 20, a plurality of conventional analog telephones 22, and personal computer (PC) 24 with the modem thereof connected to line 16.

WLL terminal 14 is a conventional, off-the-shelf unit operable to provide wireless communications with a cellular network, preferably a digital cellular (PCS) network. Terminal 14 also includes data port 26 for digital data including digital fax signals. As those skilled in the art appreciate, a PCS network can receive digital fax signals provided by a PC at the data port of a WLL terminal and deliver the telefacsimile represented thereby to an analog fax machine connected to a wireline telephone network. Similarly, a PCS network can deliver fax signals generated by an analog fax machine connected to the wireline network as digital fax signals to a PC connected to the data port of a WLL terminal.

Referring to FIG. 2, fax data interface apparatus 10 includes digital fax port 28 connected to data port 26 of terminal 14, analog fax port 30 connected to telephone line 16, and signal processor 32 connected between fax ports 28, 30. Signal processor 32 includes fax/data modem 34, audio matching circuit 36 and fax/data controller 38.

Modem 34 is a conventional, off-the-shelf unit operable to modulate digital fax tones to produce analog fax tones. Similarly, modem 34 is operable to demodulate analog fax tones in order to produce digital fax tones. The digital data side of modem 34 is connected to data port 26 of terminal 14 by way of controller 38.

Audio matching circuit 36 is connected between the analog side of modem 34 and analog fax port 30, which is connected to telephone line 16 as shown. Circuit 36 includes transformer T1, capacitor C1, resistor R1 and relay 40 including coil 42 and normally open contact 44 connected across resistor R1. Coil 42 is connected to controller 38. With relay 40 de-energized, contact 44 is open. As a result, resistor R1 along with the other components of circuit 36 provide a high impedance connection between modem 34 and telephone line 16. This is the normal state when fax machine 20 is not in use.

With relay 40 energized, contact 44 is closed bypassing resistor R1 in order to provide a low impedance coupling between modem 34 and telephone line 16. Controller 38 energizes coil 42 when fax 20 is in use in order to provide the low impedance coupling for reliable data transfer.

Controller 38 includes a conventional microprocessor, ROM, RAM, and a data buffer in order to buffer the data rates between fax machine 20 and the fax machine with which it is communicating. Controller 38 also includes programming stored in the ROM to operate the microprocessor in order to perform the operations described below.

In operation to send a telefacsimile, fax machine 20 goes off hook and WLL terminal 12 provides dial tone on telephone line 16. In response, machine 20 dials the called number typically using DTMF tones. Terminal 14 collects the digits representative of the DTMF tones and initiates the call to the called number (another fax machine). After dialing the telephone number, fax machine 20 initiates analog fax signals in the nature of "send fax tones," typically CNG tones, which are out of the voice band.

Signal processor 32 receives the analog fax signals from fax machine 20 by way of telephone line 16 at analog fax port 30 and responds to produce digital fax signals representative thereof at digital fax port 28. More specifically, modem 34 receives the CNG tones by way of circuit 36 through the high impedance path of R1 because contact 44 is open. Modem 34 demodulates the CNG tones and provides digital fax signals representative thereof to WLL terminal 14 by way of controller 38.

Controller 38 monitors the digital fax signals from modem 34 and determines that the signals are representative of CNG tones. In response, controller 38 energizes coil 42 to close contact 44 in order to provide a lower impedance path through circuit 36. Controller 38 also sends a data channel request message to terminal 12 to cause the PCS network to provide a data channel and not a voice channel. Digital fax signals representative of the CNG tones are also sent over the network to the destination fax machine.

Fax machine 20 then sends analog fax signals representative of the telefacsimile message. Contact 44 is closed and circuit 36 provides low impedance coupling between modem 34 and telephone line 16 for accurate data transfer. Modem 34 demodulates the analog fax signals to provide digital fax signals representative thereof to terminal 14 by way of digital fax port 28 and data port 26. In this way, apparatus 10 provides simulation of the analog fax signals from fax 20 as digital fax signals of the type produced by a PC to WLL terminal 14. Upon termination of the connection between fax machine 20 and the receiving fax, controller 38 de-energizes relay 40.

For manual initiation of fax machine 20, a normal call is placed using the voice channel. When communication is established, the caller then pushes the start button on fax machine 20. This initiates the CNG tones. Signal processor 32 detects the CNG tones, energizes relay 40 and sends the data channel request message to terminal 12 which responds by requesting the PCS network to provide a data channel instead of the voice channel.

In operation when receiving a telefacsimile, WLL terminal 12 initiates ringing on telephone line 16 in response to receipt of the call over the PCS network. As is conventional, fax machine 20 is configured to go off hook, that is, answer the call, after detecting a predetermined number of ring signals. Upon going off hook, fax machine 20 transmits analog fax signals in the nature of "receive fax tones," typically CED tones.

As discussed above in connection with CNG tones, signal processor 32 detects the CED tones, controller 38 energizes relay 40 to close contact 44 and sends the data channel request message to terminal 14. In response, terminal 14 signals the PCS network to provide a data channel instead of the voice channel and sends digital fax data representative of the CED tones to the calling fax machine. Terminal 14 receives the telefacsimile message from the calling fax machine and provides the digital fax signals to apparatus 10 at digital fax port 28.

Modem 34 receives the incoming digital fax signals by way of controller 38 and produces analog fax signals representative thereof at analog fax port 30 as corresponding analog fax signals. These analog fax signals are delivered to fax machine 20 by way of telephone line 16. Thus, apparatus 10 also provides simulation of digital fax signals as analog fax signals to fax machine 20. Upon termination of the telefacsimile message, controller 38 de-energizes terminal 40.

Apparatus 10 is also operable to provide the interface for analog computer tones such as those produced by the modem of PC 24. In the alternative, the serial port of PC 24 can be connected directly to data port 26 of terminal 14.

Those skilled in the art will appreciate that the present invention encompasses many variations in the preferred embodiment described herein. For example, apparatus 10 and WLL terminal 14 can be integrated into a single unit rather than providing two separate components. Also, wireless communications can replace the preferred telephone line 16. As a further example, fax machine 20 can be connected directly to analog fax port 30 of apparatus 10. Having thus described the preferred embodiment of the present invention, the following is claimed as new and desired to be secured by Letters Patent:

What is claimed is:

1. A fax/data interface apparatus for use with a wireless local loop (WLL) including a WLL terminal having an analog telephone port and a data port, a telephone line coupled with the telephone port, and an analog port and a data port, a telephone line coupled with the telephone port, and an analog fax machine coupled with the telephone line, said apparatus comprising:

a digital fax port configured for connecting to the data port of the WLL terminal;

an analog fax port configured for connecting to the telephone line; and a signal processor interconnecting said fax ports and operable to receive digital fax signals from the WLL terminal at said digital fax port and responsive thereto to produce analog fax signals representative thereof at said analog fax port for delivery to the fax machine by way of the telephone line, and operable to receive analog fax signals from the fax machine by way of the telephone line at said analog fax port and responsive thereto to produce digital fax signals representative thereof at said digital fax port for delivery to the WLL terminal, said signal processor being also operable to detect receive fax tones and to detect send fax tones at said analog fax port, and said signal processor including a controller coupled with the digital fax port, a fax/data modem coupled with the controller and operable to convert analog fax tones to digital data and to convert digital data to analog fax tones, and an audio matching circuit coupled between said modem and said analog fax port and including a resistor for attenuating analog signals received at said analog fax port and a relay including a contact coupled in parallel with said resistor, said controller being coupled with said relay and operable to energize said relay and close said contact to bypass said resistor in response to detection of either of said receive fax tones and send fax tones.

* * * * *